United States Patent [19]
Greene

[11] Patent Number: 6,127,506
[45] Date of Patent: Oct. 3, 2000

[54] PROCESS FOR MELT SPINNING SPANDEX

[75] Inventor: Robin N. Greene, Lewes, Del.

[73] Assignee: E. I. du Pont de Nemours and Company, Wilmington, Del.

[21] Appl. No.: 09/253,685

[22] Filed: Feb. 19, 1999

[51] Int. Cl.$^7$ ............................................. C08G 18/10
[52] U.S. Cl. ................ 528/61; 528/906; 264/176.1; 264/178 F
[58] Field of Search .................. 528/906, 61; 264/176.1, 264/178 F

[56] References Cited

U.S. PATENT DOCUMENTS

| | | | |
|---|---|---|---|
| 3,415,790 | 12/1968 | Davis et al. | 260/77.5 |
| 3,503,933 | 3/1970 | Kaizerman et al. | 260/75 |
| 4,107,256 | 8/1978 | Conrad et al. | 264/310 |

OTHER PUBLICATIONS

G. Oertel; Polyurethane Handbook; 1985; p. 578.

*Primary Examiner*—Rachel Gorr
*Attorney, Agent, or Firm*—George A. Frank

[57] ABSTRACT

A process for melt spinning spandex, utilizing a polyurethaneurea polymer prepared from a purified capped glycol, linear aliphatic diamines and a monoamine chain terminator, is provided.

10 Claims, No Drawings

PROCESS FOR MELT SPINNING SPANDEX

BACKGROUND

1. Field of the Invention

This invention relates to a process for making spandex by melt-spinning of polyurethaneureas and, more particularly, to a process of prepurifying the capped glycol prior to the formation of the polyurethaneurea.

2. Discussion of Background Art

Spandex has been traditionally prepared by reacting a polymeric glycol with a diisocyanate to form a capped glycol (an isocyanate-terminated prepolymer which contains a distribution of reaction products including unreacted diisocyanate), dissolving the capped glycol in a suitable solvent, contacting the solution with a diamine chain extender and optionally a monoamine chain terminator to form a solution of segmented elastomeric polyurethaneurea, and dry- or wet-spinning the solution to form spandex.

U.S. Pat. No. 3,415,790 discloses the preparation of spandex in which capped glycol is extracted before it is dissolved in a solvent, contacted with a difunctional chain extender, and dry-spun into filaments. In this method, polymer must be prepared and spun into fiber at the same site to avoid the expense of shipping solutions.

U.S. Pat. No. 3,503,933 discloses melt-spun spandex, but special, asymmetric diisocyanates are required which have at least a five-fold difference in the reactivity of the two isocyanate groups. Due to the presence of such diisocyanates, such spandex is expected to be unsatisfactory in processing (high tack and therefore difficult to backwind), in fabric properties (low unload power), and in fabric processing such as dyeing, finishing and laundering (high hot-wet creep).

Such methods are inadequate in that either a spinning solvent or special disocyanates are necessary to prepare the spandex, with resulting disadvantages in the spinning process or in the resulting spandex. A melt-spun process is still needed which will produce a spandex with good properties.

SUMMARY OF THE INVENTION

The present invention is a process for making spandex comprising the steps of:

(a) reacting a polymeric glycol with a diisocyanate at a capping ratio of 1.3–2.2 to form a capped glycol, the diisocyanate having isocyanate groups of substantially equal reactivities;

b) removing from the product of step (a)
  (i) at least about 70% of unreacted diisocyanate when a chain extender to be utilized in step (c) is selected from the group consisting of linear diamines having 3,5 and of 7–18 carbon atoms;
  (ii) at least about 80% of unreacted diisocyanate when a chain extender to be utilized in step (c) is 1,6-diaminohexane; and
  (iii) at least about 85% of unreacted disocyanate when a chain extender to be utilized in step (c) is selected from the group consisting of linear diamines having 2 and 4 carbon atoms;

c) reacting the product of step (b) with a linear aliphatic diamine chain extender having 2–18 carbon atoms in the chain and a monoamine chain terminator to form a polyurethaneurea polymer having an inherent viscosity of 1–3.3 and a melting point $\leq 200°$ C.; and d) melt-spinning the polyurethaneurea formed in step (c) to form the spandex.

DETAILED DESCRIPTION OF THE INVENTION

It has now been unexpectedly found that by using specific ingredients under controlled, specified conditions, melt-spun spandex with good properties can be prepared from polyurethaneureas. As used herein, "spandex" means a manufactured fiber in which the fiber-forming substance is a long chain synthetic elastomer comprised of at least 85% by weight of a segmented polyurethane.

Polymeric glycols that can be used in the process of the present invention can be polyether glycols, polyester glycols, polycarbonate glycols, and copolymers thereof. For example, polyether glycols can be poly (tetramethyleneether) glycol or poly(tetramethyleneether-co-3-methyltetramethyleneether) glycol. When a copolyether is used, the 3-methyltetramethylene moiety is present in the range of about 4–20 mole percent. Polyester glycols can be the reaction products of glycols such as ethylene glycol, propylene glycol, 2,2-dimethyl-1,3-propanediol, and 1,4-butanediol, including mixtures thereof, with diacids such as succinic acid, adipic acid, and 1,12-dodecanedioic acid. Polyesters derived from the ring opening of lactones such as $\epsilon$-caprolactone can also be used, as well as polyetheresters comprised of elements of the above polyethers and polyesters. Polycarbonate diols can be the reaction products of an alkylene carbonate with linear aliphatic diols such as 1,6-hexane diol, 1,5-pentane diol, and the like. Polyether and copolyether glycols are preferred.

During the process of this invention, a diisocyanate is contacted with the polymeric glycol to yield a capped glycol. In the present invention, the two isocyanate groups of the diisocyanate have substantially the same reactivities toward the hydroxyl groups of the polymeric glycol. Examples include 1,1'-methylenebis(4-isocyanatobenzene) (hereinafter "MDI"), 1,6-hexamethylene diisocyanate, and bis(4-isocyanatocyclohexyl)methane. MDI is preferred. The molar ratio of the diisocyanate to the polymeric glycol in the capping reaction is called the capping ratio.

In the process of the present invention, capping ratios of about 1.3–2.2, preferably 1.4–1.9, are used.

It is a requirement of this invention that unreacted diisocyanates be capable of being removed from reaction mixture containing the capped glycol. The removal of unreacted diisocyanate can be done by known methods such as extraction and distillation (including thin-film distillation). The resulting intermediate is referred to as purified capped glycol.

To prepare the polyurethaneureas of this invention, linear aliphatic diamine chain extenders, having 2–18 carbon atoms in the linear chain, are utilized. 1,12-Diaminododecane is the preferred chain extender. When 1,12-diaminododecane is used and the proportion of chain terminator is chosen so that the inherent viscosity of the resulting polymer before spinning is about 1.0–3.3, preferably 2.0–2.5, the moderate temperature required for melt spinning results in minimal degradation of the polymer as evidenced by the minimal decrease in the inherent viscosity of the solution of the as-spun filament during the course of spinning over a period of, for example, about 30 minutes.

The proportion of unreacted diisocyanate that needs to be removed depends on the chain extender used. When the number of carbon atoms in the diamine chain extender is small and even, a high percent of unreacted diisocyanate must be removed from the purified capped glycol in order to avoid difficulties such as polymer degradation during melt-spinning. Thus, when the chain extender has 2 or 4 carbon atoms, at least about 85% of the unreacted diisocyanate must be removed. At least about 70% of the unreacted diisocyanate is removed when the diamine chain extender has 3, 5, or 7–18 carbon atoms, and at least about 80% removal is preferred. When the linear chain extender has 6 carbon atoms, at least about 80% of the unreacted diisocyanate is removed. In all cases, it is most preferred to remove at least 95% of the unreacted diisocyanate.

Minor amounts of branched coextenders can also be used provided such coextenders do not interfere with melt-spinnability or spandex properties. For example, up to about 10 mole % of total chain extender can be 2-methyl-1,5-diaminopentane ("MPMD"), 1,3-diaminopentane ("DAMP"), and the like.

It is required that a monoamine chain terminator be used to control the molecular weight, so that the inherent viscosity of the polyurethaneurea prepared by the process of the present invention is in the range of about 1.0–3.3, preferably about 2.0–2.5. For example, secondary amines such as diethylamine and primary amines such as n-butylamine can be used. Primary amines are preferred. In order to control the molecular weight, the number of polymer ends formed with chain terminator (alkylurea ends) must exceed the number of polymer ends formed with chain extender (amine ends).

In order to minimize thermal degradation during melt-spinning, the polyurethaneurea should have a melting point $\leq 200°$ C. and preferably $\leq 190°$ C.

The chain extension and termination reactions can be carried out in a solvent for the polyurethaneurea polymer such as dimethylacetamide (DMAc), N-methylpyrrolidone and dimethylformamide. The polymer can then be recovered, for example, by evaporation of the solvent or by precipitation into a non-solvent for the polyurethaneurea which is miscible with the solvent, followed by filtration. Alternatively, the chain extension and termination reactions can be carried out at the interface between the purified capped glycol and a non-solvent for the capped glycol and polyurethaneurea, such non-solvent being unreactive toward the isocyanate moiety, for example hydrocarbons such as hexane or heptane. In this case, the polyurethaneurea precipitates at the interface as it is formed. The polymer can then be recovered by filtration and dried for storage, transport, and melt-spinning. Interfacial chain extension and termination is preferred.

Drawing the melt-spun filaments (for example at a draw ratio of about 1.5–3) is helpful in attaining low percent set. Optionally, the drawing can be combined with heating, for example, over one or more hot pins.

In the Examples, the total isocyanate moiety content of the capped glycols was measured by the method of S. Siggia, "Quantitative Organic Analysis via Functional Group", 3rd Edition, Wiley & Sons, New York, pp. 559–561 (1963) and is reported as weight percent. When the isocyanate groups of the diisocyanate have substantially equal reactivity and the capping reaction proceeds substantially to completion, as in the present invention, the amount of unreacted diisocyanate in the capped glycol can be calculated according to the following equations, which are derived from those of P. J. Flory, J. Am. Chem. Soc., Vol. 58, 1877–85 (1936):

$$\text{Mole \% unreacted diisocyanate} = 100 \times (CR - 1)/CR \quad (1)$$

$$\text{Weight \% unreacted diisocyanate} = \frac{100 \times [MW_{DI} \times (CR - 1)^2]}{[(CR \times MW_{DI}) + MW_G] \times CR} \quad (2)$$

$$\text{Wt \% } NCO \text{ in capped glycol} = \frac{2 \times MW_{NCO} \times (CR - 1) \times 100}{CR \times MW_{DI} \times MW_G} \quad (3)$$

$$\text{Wt \% } NCO \text{ in purified capped glycol} = \frac{\text{Grams attached} NCO \times 100}{100 - \text{grams free } DI \text{ extracted}} \quad (4)$$

wherein CR is the capping ratio, MW is molecular weight, DI is diisocyanate, and G is polymeric glycol. Grams of attached NCO can be calculated by subtracting the grams of "free" NCO from the total grams of NCO based on equation (3). Grams of "free " NCO is equal to the weight of unreacted diisocyanate (based on equation (2)) times the mole fraction of NCO in the diisocyanate. Equation (2) was used in the Examples to calculate the amount of unreacted diisocyanate in the capped glycol.

The inherent viscosity of the polymers was measured in accordance with W. R. Sorenson et al., "Preparative Methods of Polymer Chemistry", Interscience Publishers, 2nd ed. (1968), p. 44. A solution of 0.5 g of polymer (obtained by precipitating the reaction mixture into water, filtering and drying the precipitate under vacuum at room temperature for 2 days) in 100 ml of m-cresol at 30° C. was used unless otherwise indicated.

Melting points were measured with a DuPont Model 9900 Differential Scanning Calorimeter (DSC) in accordance with B. Wunderlich, "Thermal Analysis", Rensselaer Polytechnic Institute (1981). The determinations were made under nitrogen at 10° C./min temperature rise from room temperature. The melting point was defined as the temperature at the lowest point of the endotherm of transition to an isotropic melt during the first heating.

The strength and elastic properties of the spandex were measured in accordance with the general method of ASTM D 2731-72. A single filament, a 2-inch (5-cm) gauge length and a zero-300% elongation cycle were used for each of the measurements, which were repeated three times for each sample and the average reported. Each sample was cycled five times at a constant elongation rate of 50 cm/min. Unload power was the stress at extensions of 167%, 100%, and 60% on the fifth unload cycle and was reported in deciNewtons per effective tex. "Effective tex" means that the tex used in calculating the unload power was the tex at the percent extension at which the unload power was measured. Percent elongation at break and tenacity at break were measured on the sixth extension cycle, using modified Instron grips to which a rubber tape was attached for reduced slippage.

Percent set was determined by stretching a sample of yarn to 300% elongation and then relaxing it to 0% elongation and repeating this 5 times. The final, relaxed length of the yarn was measured 30 seconds after the filament reached zero stress at the end of the fifth cycle. % Set was calculated as follows:

$$\% \text{ Set} = \frac{\text{Relaxed length (after 5 cycles)} - \text{initial length} \times 100}{\text{Initial length}}$$

EXAMPLE 1

(A) Preparation of Purified Capped Glycol

Poly(tetramethyleneether) glycol, number average molecular weight 1800 (Terathane® 1800, a registered trademark of E.I. du Pont de Nemours and Company) was capped with MDI at a capping ratio of 1.57. The resulting capped glycol was calculated, using equation (2), to contain 2.36% by weight of unreacted MDI, corresponding to 0.793 gram of unreacted NCO in 100 grams of capped glycol. 100 grams of this capped glycol was put into a liquid-liquid extraction apparatus (Lab Glass, Vineland, N.J.; Model LG-6980) and extracted continuously at room temperature with hexane over a period of six days. Each day, the hexane extract was removed and, after removal of hexane, the residue was analyzed for weight percent NCO. Results of the residue analyses are shown in Table 1.

TABLE 1

| Day | Residue in extract (g) | Wt % NCO in residue | NCO in residue (g) | Cumulative NCO in residue (g) |
|---|---|---|---|---|
| 1 | 4.67 | 15.2 | 0.710 | 0.710 |
| 2 | 1.30 | 4.60 | 0.060 | 0.770 |
| 3 | 1.47 | 3.15 | 0.046 | 0.816 |
| 4 | 1.45 | 3.44 | 0.050 | 0.866 |
| 5 | 1.18 | 3.11 | 0.037 | 0.903 |

Analysis of the third day's extract by gel permeation chromatography showed that there was less than 1% free MDI in the extract, the rest of the extract containing low molecular weight fractions of capped glycol. After three days of extraction, the analyzed weight percent of isocyanate in the resulting purified capped glycol was 1.35%, which was less than the calculated amount of 1.42% NCO (from equation (4)) expected after 100% extraction of unreacted MDI. That is, all of the free MDI had been extracted, and minor mounts of lower MW fractions of capped glycol had also been removed.

(B) Chain Extension of Purified Capped Glycol and Melt Spinning

Capped glycol made as described in Example 1(A) was extracted with hexane for three days to remove substantially all of the unreacted diisocyanate. After hexane was removed under vacuum, 51.62 g of the resulting purified capped glycol, which had a measured isocyanate content of 1.35% NCO (16.58 meq of NCO) was dissolved in 138.2 g of anhydrous DMAc. A mixture of 17.4 g of a 1 meq/g ethylenediamine solution (17.4 meq total) and 1.30 g of a 1.2 meq/g of n-butylamine solution (1.56 meq total) was added rapidly at room temperature with vigorous stirring in an argon atmosphere. The calculated amount of polymer formed was 52.41 g. Chain extender and terminator were added slightly in excess of that needed to react with all isocyanate ends on the purified capped glycol, so that the resulting polyurethaneurea had 15.7 meq/kg amine ends and 29.9 meq/kg alkylurea ends. A one-gram quantity of a 42% solution of 2,4,6-tris(2,6-dimethyl-4-t-butyl-3-hydroxybenzyl)isocyanurate (Cyanox® 1790, Cytec Industries, West Patterson, N.J.) in DMAc was added for each 100 g of polymer solution (1.5 wt % additive based on polymer weight). The polymer was precipitated by pouring the solution into water while stirring vigorously in a Waring Blender. After drying at 60° C. for two days, the polymer had an inherent viscosity of 2.32 measured in m-cresol, and 2.50 measured in 60/40 phenol/tetrachloroethane.

A 20-g portion of the polymer was melt spun in a single-hole plug press spinner as described in U.S. Pat. No. 4,906,729. The cell temperature was 203° C., and the spinnerette temperature was 214° C. The filament was spun at a rate of 0.55 g/min, passed around a take-up roll at 40 meters/min, drawn on a draw roll at 70 meters/min (a draw ratio of 1.75), and then wound onto a bobbin at 70 meters/min. No finish was used. The inherent viscosity of the initial filament extruded as measured in m-cresol was 2.26, showing only minimal change from the as-polymerized polyurethaneurea. Analytical results are reported in Table 2, which indicate that spandex having good properties can be made by the process of this invention.

EXAMPLES 2–9

These Examples illustrate the preparation of a spandex having good properties by the process of the present invention using a series of diamine chain extenders of the formula $H_2N$—$(CH_2)_n$—$NH_2$ wherein n is an integer 3–10. Polymers were prepared, isolated, and melt-spun as in Example 1, except that the number of carbons in the diamine chain extender was varied. The analytical results are reported in Table 2.

EXAMPLE 10

Capped glycol made as described in Example 1(A) was extracted with hexane for three days to remove substantially all of the unreacted diisocyanate. After removal of hexane by vacuum, 50.78 g of the resulting purified capped glycol, which had an isocyanate content of 1.35% NCO (total milliequivalents of NCO=16.32) was dissolved in 140.5 g anhydrous DMAc. A mixture of 17.1 g of a solution of 1 meq/g 1,12-diaminododecane (17.1 meq total) and 1.31 g of a solution of 1.2 meq/g n-butylamine (1.57 meq total) was added rapidly at room temperature under argon. The calculated amount of polymer formed was 52.42 g. The amount of 1,12-diaminododecane added was sufficient to give an amine ends level of 14.9 meq/kg of polymer, and the amount of n-butylamine added was sufficient to yield an alkylurea ends level of 30.0 meq/kg of polymer. After adding sufficient Cyanox® 1790 to result in 1.5 wt % additive based on polymer weight, the polymer was precipitated by pouring the DMAc solution into water while stirring vigorously in a Waring Blender. After being dried at 60° C. for two days, the resultant polymer had an inherent viscosity of 2.52 when measured in m-cresol, and 2.78 when measured in 60/40 phenol/tetrachloroethane.

A 20-g portion of the polymer was melt spun as described in Example 1(B), except that the cell temperature was 198° C. and the spinnerette temperature was 210° C. The filament was spun at a rate of 0.55 g/min, passed around a take-up roll at 40 meters/min, drawn on a draw roll at 70 meters/min, and then wound onto a bobbin at 70 meters/min. No finish was used. The inherent viscosity of the initially spun filament spun was 2.26 as measured in m-cresol. Analytical results are reported in Table 2.

EXAMPLE 11

Capped glycol was made as described in Example 1(A) except that a capping ratio of 1.40 was used. It was extracted with hexane for three days to remove substantially of the unreacted diisocyanate. After the removal of hexane by vacuum, 50.0 g of the resulting purified capped glycol, which had an isocyanate content of 1.14% NCO (total 13.56 meq of NCO) was dissolved in 104.9 g anhydrous DMAc. A mixture of 14.33 g of a solution of 1 meq/g of 1,12-diaminododecane (14.33 meq total) and 1.93 g of a solution of 1.2 meq/g of diethylamine (2.32 meq total) was added rapidly at room temperature under argon. The calculated amount of polymer formed was 51.34 g. The amount of 1,12-diaminododecane used was sufficient to give an amine ends level of 15.0 meq/kg of polymer, and the amount of terminator added was sufficient to give a dialkylurea ends level of 45.2 meq/kg of polymer. The polymer was precipitated by pouring the DMAc solution into water while stirring vigorously in a Waring Blender. The polymer was dried at 60° C. for two days; it had an intrinsic viscosity ("int") of 1.33 measured in DMAc, which corresponds to an inherent viscosity of 2.55 in m-cresol, according to the following empirically-derived equation:

$$\text{inherent viscosity} = -0.72 \times \text{int}^2 + 3.48 \times \text{int} - 0.8$$

20 g of the polymer was cut into small pieces, and 0.2 g (1 wt %) of 2,4,6-tris(3,5-di-tert-butyl-4-hydroxybenzyl) mesitylene (Ethanox® 330, a phenolic antioxidant, Albemarle Chemical Corporation) was added and dispersed over the surface of the polymer by agitating the mixture. The mixture of polymer and Ethanox® 330 was dried for two days at 60° C. and then melt-spun as described in Example 1(B). The cell temperature was 210° C., and the spinnerette temperature was 224° C. The filament was spun at a rate of 0.55 g/min, passed around a take-up roll at 40 meters/min, drawn across the surfaces of two hot pins with a draw roll at 120 meters/min, and then wound onto a bobbin at 90 meters/min. The two hot pins (which were at about 100° C.) were placed about 1 cm apart between the take-up roll and the draw roll. No finish was used. The intrinsic viscosity of the initially spun filament as measured in DMAc was 0.93, corresponding to an inherent viscosity of 2.30 in m-cresol. Analytical results are reported in Table 2.

EXAMPLE 12

Capped glycol made substantially as described in Example 1(A) was found to contain 2.39 g of unreacted MDI per 100 g before extraction. A portion of this non-purified capped glycol, containing 2.20% NCO, was extracted with hexane for three days as described in Example 1(A). After hexane was removed by vacuum, there resulted 53.9 g of purified capped glycol having a measured isocyanate content of 1.51% NCO. Had all of the free MDI been extracted, the resulting NCO content would have been 1.43%. Since the residual percent NCO was higher than 1.43, not all of the free MDI has been removed. It was calculated that 9.7 wt % of the unreacted MDI remained. This partially purified capped glycol was dissolved in 142.7 g anhydrous DMAc. Chain extension was performed with a 9:1 molar ratio mixture of ethylenediamine and 2-methyl-1,5-pentanediamine (MPMD), a co-extender, as follows. A mixture of 18.2 g of a solution of 1 meq/g of ethylenediamine (18.2 meq total) and 2.0 g of a solution of 1 meq/g of MPMD (2.0 meq total) was added rapidly at room temperature under argon along with 1.36 g of a solution of 1.2 meq/g of n-butylamine (1.63 meq total). The amount of combined diamine chain extenders used was sufficient to give an amine ends level of 15.0 meq/kg of polymer, and the amount of n-butylamine used was sufficient to give an alkylurea ends level of 30.0 meq/kg. The calculated amount of polymer formed was 54.5 g. A phenolic antioxidant (Irganox® 1010, Ciba Geigy Specialties) was added to the DMAc solution to provide a level of antioxidant of about 1% by weight of the polymer, and the polymer was precipitated by pouring the solution into water while stirring vigorously in a Waring Blender. After drying at 60° C. for two days, the polymer had an inherent viscosity of 2.03, as measured in m-cresol.

20 g of the dry polymer was melt spun as described in Example 1(B), with a cell temperature of 209° C. and a spinnerette temperature of 218° C. The filament was spun at a rate of 0.55 g/min, passed around a take-up roll at 40 meters/min, drawn on a draw roll at 70 meters/min, and then wound onto a bobbin at 70 meters/min. No finish was used. The inherent viscosity of the initially spun filament was 1.83 as measured in m-cresol. Analytical results are reported in Table 2, which indicate that low levels of a branched diamine in combination with linear diamines can be utilized in the chain extension reaction of this invention to produce melt-spun spandex with good properties.

EXAMPLE 13 (Comparison)

This Example demonstrates that when the linear chain extender is ethylene diamine and the level of unreacted MDI remaining in the partially purified capped glycol is greater than 15%, the process is outside of the scope of this invention.

A polymer was prepared as described in Example 12, except that 19.6 wt % of unreacted MDI remained after extraction (% NCO=1.59). The dried polymer had an inherent viscosity of 2.51, as measured in m-cresol. With the same spinning equipment and procedure as described in Example 1(B), filaments could be melt-spun when the cell temperature was about 210–225° C., but they could not be wound up at 40 meters/min. At a cell temperature of about 235° C. and a spinnerette temperature of about 245° C., the filament could be attenuated and drawn 1.8×, although with frequent breaks, but the filament stuck to the roll and to itself, so that it could not be wound onto the bobbin from the draw roll. The spin process soon had to be terminated due to severe degradation of the polymer, as reported in Table 2. Comparing these results to those of Examples 12 and 21, it is apparent that, even with small amounts of non-linear co-extenders, use of linear chain extenders with a small and even number of carbons (here, 2) in the process of the invention requires the extraction of more than about 85% of the unreacted diisocyanate.

EXAMPLE 14 (Comparison)

This Example demonstrates that the use of only a non-linear diamine chain extender falls outside the scope of this invention.

Capped glycol was prepared and extracted with hexane for three days as described in Example 1(A). After hexane was removed by vacuum, 57.19 g of the resulting purified capped glycol, having an isocyanate content of 1.48% NCO (total meq of NCO=20.14), was dissolved in 210.0 g anhydrous DMAc. A mixture of 21.0 g of a solution of 1 meq/g of 1,2-diamino-2-methylpropane ("DAMP") (21.0 meq total) and 2.18 g of a solution of 1.2 meq/g of diethylamine (2.62 meq total) was added rapidly with vigorous stirring at room temperature under argon. The calculated amount of polymer formed was 58.07 g. The amount of DAMP used was sufficient to give an amine ends level of 14.8 meq/kg of polymer, and the amount of diethylamine used was sufficient to give a dialkylurea ends level of 45.1 meq/kg of polymer. After adding 0.6 g of Ethanox® 330 dissolved in a small amount of DMAc to the polymer solution, the polymer was precipitated by pouring the DMAc solution into water while stirring vigorously in a Waring Blender. Differential Scanning Calorimetry showed no melting point. The inherent viscosity was not measured but, based on the stoichiometry and in comparison to other examples, e.g., Example 15, it was estimated that the inherent viscosity in m-cresol would have been over 2.0.

20 g of the polymer was cut into small pieces, and 0.2 g (1 wt % based on polymer) of Ethanox® 330 was added and dispersed over the surface of the polymer by agitating the mixture. After the mixture of polymer and Ethanox® 330 was dried for two days at 60° C., it was melt spun as described in Example 1(B), with a cell temperature of 200° C. Filaments could not be wound up. Even with very slow wind-up close to the spinnerette to avoid the problem of low melt strength, and even with the use of a silicone-oil based finish, the filaments coalesced into a continuous band on the bobbin. As a result, it was not possible to obtain filament properties.

EXAMPLES 15 (Comparison)

This Example shows the poor results obtained when a non-linear diamine different from that in Example 14 is used as the only chain extender in the present process.

Capped glycol was prepared and extracted with hexane for three days as described in Example 1(A). After hexane was removed by vacuum, 51.0 g of the resulting purified capped glycol having an isocyanate content of 1.34% NCO (total meq of NCO=16.27) was dissolved in 138.4 g anhydrous DMAc. A mixture of 17.0 g of a solution of 1 meq of 2-methyl-1,5-pentamethylenediamine ("MPMD") per g of solution (17.0 meq total) and 1.30 g of a solution of 1.2 meq of n-butylamine per g of solution (1.56 meq total) was added rapidly at room temperature under argon. The calculated amount of polymer formed was 51.95 g. The amount of MPMD used gave an amine ends level of 14.0 meq/K of polymer, and the amount of n-butylamine used gave an alkylurea ends level of 30.0 meq/kg of polymer. After adding Cyanox® 1790 to give 1.5 wt % based on polymer, the polyurethaneurea was precipitated by pouring the DMAC solution into water while stirring vigorously in a Waring Blender. The polymer was filtered and then dried for two days at 60° C.

20 g of the polymer was cut into small pieces, and 0.2 g (1 wt % based on polymer weight) of Ethanox® 330 was added and dispersed over the surface of the polymer by agitating the mixture. After the mixture of polymer and Ethanox® 330 was dried for two days at 60° C., it was melt spun as described in Example 1(B), with a cell temperature of 186° C. and a spinnerette temperature of 197° C. The melt strength of the as-spun filament was sufficient to allow wind-up, but even with the use of a silicone-oil based finish, the filaments coalesced into a continuous band on the bobbin and, therefore, it was not possible to obtain filament properties. The initially spun filament had an inherent viscosity of 2.47 in m-cresol, indicating no degradation.

EXAMPLE 16

This Example illustrates the preparation of a polyurethaneurea from a purified capped glycol by interfacial chain extension and termination in hexane.

Capped glycol made as described in Example 1(A) except with a capping ratio of 1.49 was extracted with hexane for three days. After hexane was removed by vacuum, 51.67 g of the resulting purified capped glycol having an isocyanate content of 1.16% NCO (total NCO=14.26 meq) was dispersed rapidly in about 400 ml of warm hexane under argon in a heated Waring Blender which had been pretreated to silanize the glass and the stirrer blade. 1.99 g of a DMAc solution of 1.2 meq/g of n-butylamine (2.39 meq total) in 50 ml of hexane at room temperature was added rapidly under argon, and the mixture was stirred rapidly for about 3 min. Then 100 ml of a hot hexane solution containing 1.506 g of 1,12-diaminododecane (15.06 meq total) was added while stirring vigorously. Solid particles of polymer formed immediately. After stirring for 10 min, the polymer was isolated by filtering the dispersion through cheesecloth. The calculated amount of polymer formed was 53.09 g. The amount of 1,12-diaminododecane used gave an amine ends level of 15.1 meq/kg of polymer, and the amount of n-butylamine used gave an alkylurea ends level of 45.0 meq/kg of polymer. After drying at 60° C. for two days, the polymer had an inherent viscosity of 2.00 measured in m-cresol.

20 g of the polymer was cut into small pieces, and 0.2 g (1 wt % based on polymer) of Ethanox® 330 was added and dispersed over the surface of the polymer by agitating the mixture. After the mixture of polymer and Ethanox® 330 was dried for two days at 60° C. , it was melt spun as described in Example 1(B), with a cell temperature of 186° C. and a spinnerette temperature of 190° C. The filament was spun at a rate of 0.5 g/min, passed around a take-up roll at 40 meters/min, drawn across the surfaces of two hot pins by a draw roll at 120 meters/min, and then wound onto a bobbin at 100 meters/min. The two hot pins, operated at about 90° C., were placed about 1 cm apart between the take-up roll and the draw roll. No finish was used. Analytical results are reported in Table 2. The properties are very similar to those from polymer prepared from DMAc solution as in Example 10. Interfacial polymerization with hexane avoids the use of expensive and high-boiling DMAc.

EXAMPLE 17

Purified capped glycol was prepared, chain extended and terminated in a Waring Blender substantially as described in Example 16. The amount of 1,12-diaminododecane used gave an amine ends level of 14.9 meq/kg of polymer. However, the amount of n-butylamine used was reduced so that the alkylurea ends were 22.5 meq/kg of polymer, that is, one-half the level of that in Example 16 but still above the amine ends level. After drying at 60° C. for two days, the polymer had an inherent viscosity of 3.22 as measured in m-cresol.

20 g of the polymer was cut into small pieces, and 0.2 g (1 wt % based on polymer) of Ethanox® 330 was added and dispersed over the surface of the polymer by agitating the mixture. After the mixture of polymer and Ethanox® 330 was dried for two days at 60° C., it was melt spun as described in Example 16, with a cell temperature of 199° C. and a spinerette temperature of 210° C. The filament was spun at a rate of 0.55 g/min, passed around a take-up roll at 40 meters/min, drawn across the surfaces of two hot pins by a draw roll at 120 meters/min, and then wound onto a bobbin at 100 meters/min. The hot pins, operated at about 90° C., were placed about 1 cm apart between the take-up roll and the draw roll. No finish was used. Analytical results are reported on Table 2. The resultant properties were similar to those of the polymer prepared from DMAc solution in Example 10.

EXAMPLE 18 (Comparison)

This example demonstrates that the process of preparing a polyurethaneurea polymer by interfacial chain extension of a purified capped glycol in the absence of chain terminator is outside the scope of this invention.

Purified capped glycol was made and chain extended with 1,12-diaminododecane in a Waring Blender as described in Example 16, except that no chain terminator was used. The amount of 1,12-diaminododecane used gave an amine ends level of 15.0 meq/kg of polymer. After drying at 60° C. for two days, the polymer could not be dissolved in DMAc, and therefore its intrinsic viscosity could not be measured. It was estimated that the inherent viscosity in m-cresol would have been >4.

20 g of the polymer was cut into small pieces, and 0.2 g (1 wt % based on polymer) of Ethanox® 330 was added and dispersed over the surface of the polymer by agitating the mixture. After the mixture of polymer and Ethanox® 330 was dried for two days at 60° C., it was attempted to melt spin the polymer as described in Example 17, but the cell temperature required for spinning was 221° C., and the spinnerette temperature required was 226° C., so that thermal degradation occurred, and filament could not be wound up, as reported in Table 2.

was dried for two days at 60° C., it was melt-spun as described in Example 1(B), with a cell temperature of 175° C. and a spinnerette temperature which cycled between 210–225° C. The filament was spun at a rate of 0.55 g/min, wound onto a take-up roll at 40 meters/min, drawn on a draw roll at 120 meters/min, and then wound onto a bobbin at 110 meters/min. No finish was used. Analytical results are reported in Table 2, which show good properties, especially low percent set.

TABLE 2

| Ex. | C.E. | Inh. Visc. | MP °C. | Cell Temp °C. | Deci Tex | Tenacity | E % | Unload Power @167% | @100% | @60% | Set % |
|---|---|---|---|---|---|---|---|---|---|---|---|
| 1 | 2 | 2.26 | 197 | 203 | 97 | 0.8 | 746 | 0.04 | 0.02 | 0.01 | 22 |
| 2 | 3 | 2.18 | 163 | 172 | 92 | 0.5 | 737 | 0.02 | 0.02 | 0.01 | 22 |
| 3 | 4 | 2.08 | 188 | 196 | 91 | 0.5 | 287 | nm | nm | nm | nm |
| 4 | 5 | 2.11 | 165 | 197 | 129 | 1.1 | 500 | 0.04 | 0.03 | 0.02 | 18 |
| 5 | 6 | 2.08 | 180 | 206 | 122 | 1.0 | 508 | 0.06 | 0.03 | 0.02 | 23 |
| 6 | 7 | 2.35 | 150 | 172 | 61 | 1.2 | 297 | 0.04 | 0.02 | 0.01 | 20 |
| 7 | 8 | 2.20 | 175 | 183 | 36 | 1.3 | 295 | 0.05 | 0.02 | 0.01 | 24 |
| 8 | 9 | 2.26 | 162 | 182 | 87 | 1.3 | 380 | 0.05 | 0.03 | 0.02 | 19 |
| 9 | 10 | 2.22 | 166 | 195 | 98 | 1.4 | 354 | 0.06 | 0.03 | 0.02 | 24 |
| 10 | 12 | 2.26 | 166 | 198 | 120 | 1.2 | 436 | 0.06 | 0.03 | 0.02 | 25 |
| 11 | 12 | 2.55 | nm | 210 | 99 | 0.9 | 369 | 0.04 | 0.02 | 0.02 | 13 |
| 12 | 2 + MPMD | 2.03 | 202 | 209 | 97 | 0.7 | 671 | 0.04 | 0.02 | 0.01 | 26 |
| 13 | 2 + MPMD | 2.51 | 202 | nm | | Very poor spinnability | | | | | |
| 14 | DAMP | >2 (est) | None | 200 | | Very poor spinnability | | | | | |
| 15 | MPMD | 2.47 | 163 | 186 | | Filaments fused on windup | | | | | |
| 16 | 12 | 2.00 | 166 | 186 | 75 | 0.9 | 460 | 0.06 | 0.03 | 0.01 | 23 |
| 17 | 12 | 3.22 | 174 | 199 | 92 | 1.2 | 417 | 0.06 | 0.03 | 0.02 | 22 |
| 18 | 12 | >4 (est) | nm | 221 | | Too high MW to be spun | | | | | |
| 19 | 12 | 1.18 | nm | 175 | 69 | 0.5 | 614 | 0.04 | 0.03 | 0.02 | 12 |
| Lycra ®T-146 | | | ca280 | — | 78 | 0.9 | 565 | 0.05 | 0.03 | 0.02 | 18 |

EXAMPLE 19

This Example shows that polyurethaneureas based on polyester glycols can also be melt-spun into spandex by the process of the present invention.

A copolyester of ethylene glycol and 1,4-butane-diol (60/40 mole ratio) with adipic acid, number average molecular weight of 3400, was capped with MDI at a capping ratio of 1.83. 60 g of this capped polyester glycol was extracted continuously in a liquid-liquid extractor with hexane over a period of three days. After hexane was removed by vacuum, 53.99 g of the resulting purified capped glycol (isocyanate content of 1.20%, corresponding to extraction of 76% of the unreacted diisocyanate) (total meq/g of NCO=15.42), was dissolved in 124.0 g anhydrous DMAc. A mixture of 16.25 g of a solution of 1 meq/g of 1,12-dodecanediamine (16.25 meq total) and 4.165 g of a solution of 1.2 meq/g of diethylamine (5.0 meq total) was added rapidly at room temperature under argon. The calculated amount of polymer formed was 55.72 g. The amount of 1,12-diaminododecane used gave an amine ends level of 14.9 meq/kg of polymer, and the amount of diethylamine used gave a dialkylurea ends level of 89.7 meq/kg of polymer. After adding Cyanox® 1790 in DMAc (1.5 wt % based on polymer), the polymer was precipitated by pouring the DMAc solution into water while stirring vigorously in a Waring Blender and then dried.

20 g of the polymer was cut into small pieces, and 0.2 g (1 wt % based on polymer) of Ethanox® 330 was added and dispersed over the surface of the polymer by agitating the mixture. After the mixture of polymer and Ethanox® 330

The numbers in the C.E. column represent the number of carbon atoms in the diamine chain extenders. Where non-linear diamines were used, they are so indicated. Tenacity is expressed in dN/tex, and unload power is expressed in dN per effective tex (that is, the tex at the % extension at which the unload power is measured). Inherent viscosities were measured in or calculated for m-cresol. Lycra® T-146 is a commercial dry-spun spandex. The abbreviation "nm" means "not measured".

The results reported in Table 2 show that polyurethaneureas made by the process of the present invention can be readily melt-spun into spandex and that the resulting fibers had good mechanical properties and a sufficiently high melting point to withstand ordinary fabric processing, washing, and drying conditions. Also, the spandex of the invention was relatively non-tacky and the fiber could be readily removed from the wound bobbin (even though no finish was used).

EXAMPLE 20

Polymer was prepared and isolated as in Example 5, using 1,6-diaminohexane chain extender, and melt-spun as described in Example 1(B). The results are recorded in Table 3. "20-1" and "20-3" indicate results for the first and third bobbins, respectively, the latter after a total spinning time of about 20 minutes.

EXAMPLE 21

As a control, about 20% of MDI was added to purified capped glycol which was prepared by removing substantially all of the unreacted diisocyanate substantially as in Example 1(A). Before extraction, 100 g of the capped glycol was calculated to contain 2.39 g of unreacted MDI and 97.61 g of glycol-MDI reaction product. Upon complete extraction, 2.448 g of unreacted MDI was expected to have been removed per 100 g of remaining, purified capped glycol.

As in Example 1, unpurified capped glycol was extracted with hexane for three days. After hexane was removed by vacuum, there resulted 50.04 g of capped glycol containing 1.33% NCO (15.84 meq NCO), less than the theoretical amount (1.41%), indicating that substantially all unreacted MDI had been removed. A quantity of 0.2418 g of MDI was then added to the purified capped glycol (equal to 19.7% of the original amount of unreacted MDI) and the resulting mixture was dissolved in 135.1 g anhydrous DMAc. A mixture of 18.54 g of a solution of 1 meq/g of 1,6-diaminohexane (18.54 meq/g total), sufficient to give an amine ends level of 15.0 meq/kg of polymer, and 1.28 g of a solution of 1.2 meq/g of n-butylamine terminator (1.54 meq/g total), sufficient to give an alkylurea ends level of 30.0 meq/kg of polymer, was added rapidly at room temperature under argon. The theoretical yield of polymer was 51.3 g. Irganox® 1010 (1% by weight of the theoretical yield of polymer) was added to the solution in DMAc, and the polymer was precipitated by pouring the DMAc solution into water while stirring vigorously in a Waring Blender.

After drying at 60° C. for two days, 20 g of the polymer was melt spun as described in Example 1(B), (cell temperature, 197° C. and spinnerette temperature, 214° C.). The filament was extruded at a rate of 0.55 g/min, passed around a take-up roll at 40 m/min, drawn on a draw roll at 70 m/min, and finally wound onto a bobbin at 70 m/min. The inherent viscosity of the initial filament extruded was 2.49. No finish was used. Filaments taken from the first and third bobbins were then analyzed, with results reported in Table 3. "21-1" and "21-3" indicate results for the first and third bobbins, respectively, the latter after 20 minutes of total spinning time.

EXAMPLE 22 (Comparison)

In comparison to Example 21, MDI, corresponding to approximately 40% of unreacted diisocyanate in a capping reaction was added to purified capped glycol which was prepared by first removing substantially all unreacted diisocyanate as described in Example 1(A). Before extraction, 100 g of capped glycol was calculated to contain 2.39 g of unreacted MDI and 97.61 g of glycol-MDI reaction product (corresponding to 2.448 g unreacted MDI per 100 g of purified capped glycol). After hexane was removed by vacuum, there resulted 53.29 g of purified capped glycol containing 1.36% NCO (16.21 meq NCO) indicating that substantially all unreacted MDI had been removed. A quantity of 0.515 g of MDI was then added to the purified capped glycol (equal to 42.0% of the original amount of unreacted MDI), and the resulting mixture was dissolved in 144.4 g anhydrous DMAc. A mixture of 22.2 g of a solution of 1 meq/g of 1,6-diaminohexane (22.2 meq/g total), sufficient to give an amine ends level of 15.0 meq/kg of polymer, and 1.36 g of a solution of 1.2 meq/g of n-butylamine terminator (1.63 meq total), sufficient to give an alkylurea ends level of 30.0 meq/kg of polymer, was added rapidly at room temperature under argon. The theoretical yield of polyurethaneurea was 55.0 g. Irganox* 1010 (1% by weight of the theoretical yield of polymer) was added to the solution in DMAc, and the polymer was precipitated by pouring the DMAc solution into water while stirring vigorously in a Waring Blender.

After drying at 60° C. for two days, 20 g of the resultant polymer was melt-spun as described in Example 1(B), (cell temperature, 222° C. and spinnerette temperature, 242° C.). The filament was spun at a rate of 0.55 g/min, passed around a take-up roll at 40 m/min, drawn on a draw roll at 70 m/min, and finally wound onto a bobbin at 70 m/min. The inherent viscosity of the initial filament spun was 2.26. No finish was used. Filaments taken from the first and third bobbins were then analyzed, with results report in Table 3. "22-1" and "22-3" indicate results for the first and third bobbins, respectively.

EXAMPLE 23 (Comparison)

Polymer was prepared as in Example 5 but without extracting the capped glycol leaving all unreacted MDI present when the capped glycol was chain extended and terminated. The resulting polyurethaneurea could not be melt-spun.

TABLE 3

| Example | Un-reacted MDI (%) | Cell temp. °C. | Tenacity | % E | Unload Power % @167 | % @100 | % @60 | % Set |
|---|---|---|---|---|---|---|---|---|
| 20-1 | 0 | 192 | 1.14 | 412 | 0.05 | 0.02 | 0.02 | 23 |
| 20-3 | 0 | 192 | 1.17 | 389 | 0.05 | 0.03 | 0.02 | 23 |
| 21-1 | 20 | 197 | 1.09 | 311 | 0.06 | 0.03 | 0.02 | 24 |
| 21-3 | 20 | 197 | 0.88 | 471 | 0.05 | 0.02 | 0.01 | 22 |
| 22-1 | 40 | 222 | 0.92 | 468 | 0.05 | 0.03 | 0.02 | 18 |
| 22-3 | 40 | 222 | 0.70 | 632 | 0.04 | 0.02 | 0.01 | 23 |
| 23 | 100 | >240 | Could not be melt-spun | | | | | |

In Table 3, tenacity is expressed in dN/tex, and unload power is expressed in dN per effective tex.

As can be seen from Table 3, the required spinning temperature (as measured by the cell temperature) increased when the amount of unreacted MDI in the purified capped glycol was increased to 40% (Example 22), at which point polymer degradation began to occur after spinning for 20 minutes (see reduced tenacity and elevated cell temperature required for spinning) or the polymer could not be melt spun at all.

What is claimed is:

1. A process for making spandex comprising the steps of:
   (a) reacting a polymeric glycol with a diisocyanate at a capping ratio of about 1.3–2.2, wherein the diisocyanate has isocyanate groups of substantially equal reactivities;
   (b) removing from the product of step (a)
      (i) at least about 70% of unreacted diisocyanate when the chain extender to be utilized in step (c) is selected from the group consisting of linear diamines having 3,5, and 7–18 carbon atoms;
      (ii) at least about 80% of unreacted diisocyanate when the chain extender to be utilized in step (c) is 1,6-diaminohexane; and
      (iii) at least about 85% of unreacted diisocyanate when the chain extender to be utilized in step (c) is selected from the group consisting of linear diamines having 2 and 4 carbon atoms;
   (c) reacting the product of step (b) with a linear aliphatic diamine chain extender having 2–18 carbon atoms in the chain and a monoamine chain terminator to form a polyurethaneurea polymer having an inherent viscosity of about 1.0–3.3 and a melting point ≦about 200° C.; and
   (d) melt-spinning said polyurethaneurea to form spandex.

2. The process of claim 1 wherein step (c) is carried out interfacially in a non-solvent for the product of step (a) and the polyurethaneurea, and further comprising, between steps (c) and (d), a step of recovering the polyurethaneurea from the non-solvent.

3. The process of claim 2 wherein the step of removing unreacted diisocyanate is a distillation step.

4. The process of claim 2 wherein the step of removing unreacted diisocyanate is an extraction step.

5. The process of claim 2 further comprising, after step (d), a step of drawing the spandex at a draw ratio of about 1.5–3.

6. The process of claim 2 wherein at least about 95% of unreacted diisocyanate is removed.

7. The process of claim 1 wherein the polymeric glycol is selected from the group consisting of poly (tetramethyleneether) glycol and poly(tetramethyleneether-co-3-methyltetramethyleneether) glycol and the diisocyanate is 1,1'-methylenebis (4-isocyanatobenzene).

8. The process of claim 7 wherein the chain extender is 1,12-diaminododecane and at least about 80% of unreacted diisocyanate is removed.

9. The process of claim 1 further comprising, between steps (b) and (c), a step of dissolving the product of step (b) in a solvent for the product polyurethaneurea and, between steps (c) and (d), a step of recovering the polyurethane from the solvent.

10. Spandex prepared by the process of claim 1.

* * * * *